United States Patent Office 3,278,643
Patented Oct. 11, 1966

3,278,643
COPOLYMERIZATION OF ALPHA-OLEFINS IN THE PRESENCE OF AN ALKYL ALUMINUM DIHALIDE, VANADIUM OXYTRICHLORIDE AND A PHOSPHORUS COMPOUND
Marco Antonio Achon, Chester, Pa., assignor to Avisun Corporation, Philadelphia, Pa., a corporation of Delaware
No Drawing. Filed Feb. 4, 1963, Ser. No. 256,097
12 Claims. (Cl. 260—88.2)

This invention relates to the copolymerization of ethylene with other polymerizable unsaturated hydrocarbons, and more particularly to novel catalyst systems for effecting such copolymerization.

The copolymerization of ethylene and propylene in the presence of a coordination complex catalyst such as the reaction product of vanadium tetrachloride or vanadium oxytrichloride and an aluminum alkyl such as aluminum triisobutyl or aluminum diethyl chloride in an inert solvent to yield a product resembling unvulcanized rubber is known to the art, and is described in Belgian Patent 553,655. Such copolymers may be crosslinked by peroxides or other free-radical generators to form a synthetic elastomer which is highly stable to degradation by ozone, due to the almost complete absence of unsaturation in the molecule. It is also known to copolymerize ethylene and propylene or other alpha olefin with a diolefin in order to introduce unsaturation into the molecule to permit vulcanization by curing systems commonly used in the rubber industry. An example of such terpolymers is shown in U.S. Patent 3,000,866. In such processes, after completion of the reaction, the reaction mixture is treated with an alcohol or other polar material to destroy the activity of the catalyst and to convert the catalyst residues to water-soluble compounds. The solution of copolymer in the solvent is then washed with water and steam-stripped to remove the solvent and to recover the copolymer as a suspension of crumbs in water.

Using the catalytic systems known to the prior art, the greater part of the ethylene and propylene is converted to a non-crystalline random copolymer which is soluble in the solvent and which is the desired product. However, a small part of the ethylene and/or propylene is converted either to a crystalline homopolymer of one of the monomers, or to a copolymer in which the molecule contains long blocks of ethylene or propylene homopolymer which appear to be crystalline by X-ray analysis. If such copolymers or homopolymers are allowed to remain in the recovered random copolymer, the raw and compounded Mooney viscosity is undesirably high, causing difficulties in processing, and the physical properties of the cured copolymer are adversely affected by the presence of the crystalline polymer.

The crystalline polymer is insoluble in the solvent and appears therein as a swollen gel. It is extremely difficult to separate the gel by filtration, but it can be removed by other methods, such as that shown in U.S. patent application Serial No. 103,710 and now U.S. Patent 3,071,566. Removal by such a method adds another processing step, which increases the cost of the process.

It is an object of this invention to provide a catalyst system for the copolymerization of olefins which will cause the polymerization to proceed in a manner such that only traces, if any, of crystalline polymer are formed.

It is a further object of this invention to provide a catalyst system which will cause polymerization to proceed at a faster rate than when using conventional catalyst systems, such as a combination of vanadium oxytrichloride and aluminum diethyl chloride.

In accordance with the present invention, it has been discovered that a three component catalyst system consisting of the product obtained by mixing, in an inert solvent, a vanadium oxytrihalide, an aluminum alkyl dihalide, and a phosphorus containing compound, such as a phosphate, thiophosphate, phosphonate, phosphine, or phosphine oxide will accomplish the foregoing objects.

The aluminum component of the novel catalyst system may be any aluminum alkyl dihalide, such as aluminum ethyl dichloride, aluminum isobutyl dichloride, aluminum ethyl dibromide, and the like. The vanadium component of the catalyst system may be vanadium oxytrichloride, or vanadium oxytribromide. The mol ratio of aluminum compound to vanadium compound should be from about 1:1 to 10:1, preferably from about 2:1 to about 5:1. Examples of phosphorus-containing aromatic compounds useful as catalyst components are triphenyl phosphine, tricresyl phosphate, tri p-tolyl thiophosphate, triphenyl phosphate, trioctyl phosphine oxide, triethyl phosphate, dimethyl methyl phosphonate, diethyl ethyl phosphonate, dibutyl butyl phosphonate, tris betachloroethyl phosphate, and tris dichloropropyl phosphate. The mol ratio of aluminum compound to aromatic compound must be from about 12:1 to about 1:1, preferably about 5:1 to 5:4 since at higher or lower ratios elastomeric polymer is not formed.

Copolymerization reaction conditions include temperatures from 0° C. to 150° C., and pressures of from 0 to 150 p.s.i.g. When operating at low pressures, say from 0 to 10 p.s.i.g., it is preferred to recirculate the feed continuously through the reactor, but when operating at higher pressures, it is preferred to introduce the feed continuously to the reactor at a rate such as to maintain the desired pressure therein. As solvents for the reaction, saturated hydrocarbons such as hexane, heptane or octane may be used. Aromatic hydrocarbons such as benzene, toluene, or xylene are also suitable, as are halogenated hydrocarbons such as perchloroethylene.

The gaseous feed of the copolymerization reactor should consist of from 20% to 80% ethylene and from 80% to 20% propylene or butene-1 depending on the amount of ethylene which it is desired to incorporate into the copolymer. When it is desired to incorporate unsaturation into the molecule, it is desirable to add to the reactor sufficient diolefin, for example cyclopentadiene, to incorporate about 0.5% to 5% unsaturation into the polymer. The diolefin can be added in its entirety at the start of the reaction, but it is preferably added in increments during the reaction, in order to incorporate it more randomly into the polymer.

At the end of the desired reaction time, when operating batchwise, the reactor is depressured, the catalyst activity is killed by the addition of an alcohol, and the product is recovered. Usually the reaction is stopped when the reaction mixture contains about 5% to 15% by weight of product, since if the reaction goes much further, the solution becomes too viscous for easy handling.

In order that those skilled in the art may more fully understand the nature of my invention and the method for carrying it out, the following examples are given:

CONTROL 1

A polymerization bottle is charged with 100 ml. of benzene, and 0.861 millimole of ethyl aluminum dichloride is added. The bottle is then pressured to 45 p.s.i.g. with a mixture of 30 mol percent ethylene and 70 mol percent propylene. 0.287 millimole of $VOCl_3$ is then added, and the polymerization bottle, which is fitted with a magnetic stirrer, is put in an oil bath at 40° C. Polymerization starts immediately, and is continued for 30 minutes while maintaining the pressure by continuous addition of the ethylene-propylene mixture. The reaction is then killed by the addition of methanol, which destroys the catalyst and precipitates the benzene-soluble polymer. A total of 1.39 grams of benzene-soluble copolymer is recovered. This polymer contains about 90% ethylene, as determined by infra-red, and is non-elastomeric in character.

*Example 1*

The procedure of Control 1 is followed, except that 0.144 millimole of tri-p-tolyl thiophosphate is added prior to pressuring the bottle with the ethylene-propylene mixture. 3.16 grams of an elastomeric copolymer having an ethylene content of 63.0% are recovered. The polymer has an RSV of 2.07.

*Example 2*

The procedure of Example 1 is followed, except that the amount of tri-p-tolyl thiophosphate is increased to 0.287 millimole. 3.25 grams of elastomeric product having an ethylene content of 66.9% are recovered. It has an RSV of 2.48.

*Example 3*

The procedure of Example 1 is followed, except that the amount of tri-p-tolyl thiophosphate is increased to .43 millimole. 3.00 grams of elastomeric copolymer having an ethylene content of 72.0% are recovered. The polymer has an RSV of 2.55.

*Example 4*

The procedure of Control 1 is followed, except that 0.144 millimole of triphenyl phosphine is added to the bottle prior to pressuring with the ethylene-propylene mixture. 1.97 grams of elastomeric copolymer are recovered.

*Example 5*

Example 4 is repeated, increasing the amount of triphenyl phosphine to 0.287 millimole. 2.85 grams of elastomeric copolymer having a reduced specific viscosity of 2.17 and an ethylene content of 59.7% are recovered.

*Example 6*

Example 4 is repeated, except that the amount of triphenyl phosphine is increased to 0.43 millimole. 2.06 grams of elastomeric copolymer are recovered.

*Example 7*

The procedure of Control 1 is followed, except that 0.144 millimole of tri-p-cresyl phosphate is added to the bottle prior to pressuring with the ethylene-propylene mixture. 2.45 grams of product are recovered. The product contained over 90% ethylene.

*Example 8*

The procedure of Example 7 is followed, except that the amount of tri-p-cresyl phosphate is increased to .287 millimole. 2.91 grams of elastomeric copolymer are recovered, containing 64.0% ethylene, and having a reduced specific viscosity of 2.02.

*Example 9*

The procedure of Example 7 is followed, except that the amount of tri-p-cresyl phosphate is increased to 0.43 millimole. 2.40 grams of elastomeric product are recovered.

*Example 10*

The procedure of Example 7 is followed, except that the amount of tri-p-cresyl phosphate is increased to .574 millimole. 2.50 grams of elastomeric copolymer are recovered.

*Example 11*

A polymerization bottle is charged with 100 ml. of hexane, and 1.88 millimoles of aluminum ethyl dichloride and 0.47 millimole of tri-octyl phosphine oxide is added. The bottle is then pressured to 40 p.s.i.g. with a mixture of 60 mol percent ethylene and 40 mol percent propylene. 0.47 millimole of $VOCl_3$ is then added, and the polymerization bottle, which is fitted with a magnetic stirrer, is put in an oil bath at 40° C. Polymerization starts immediately and is continued for 30 minutes while maintaining pressure by continuous addition of the ethylene-propylene mixture. The reaction is then killed by the addition of methanol, which destroys the catalyst and precipitates the polymer, which is entirely soluble in the hexane. A total of 0.91 grams of elastomeric copolymer containing 51.9% ethylene is recovered.

*Example 12*

Example 11 is repeated, except that the amount of trioctyl phosphine oxide is increased to 0.94 millimole. 2.00 grams of elastomeric product are recovered, which contains 52.6% ethylene, and has an RSV of 2.37.

*Example 13*

The procedure of Example 11 is followed, except that the amount of trioctyl phosphine oxide is increased to 1.41 millimole. 1.11 grams of elastomeric copolymer are recovered, having an ethylene content of 67.7%.

*Example 14*

Example 11 is repeated, except that 0.47 millimole of triethyl phosphate is used instead of trioctyl phosphine oxide. A yield of 5.40 grams of elastomeric product is obtained, having an ethylene content of 54.2%, and an RSV of 2.13.

*Example 15*

Example 14 is repeated, except that the triethyl phosphate is increased to 0.94 millimole. The yield of elastomeric copolymer is 4.00 grams, containing 57.2% ethylene.

*Example 16*

Example 14 is repeated, except that the triethyl phosphate is increased to 1.41 millimoles. 0.83 gram of elastomeric copolymer containing 77.8% ethylene was recovered.

*Example 17*

The general procedure of Example 11 is followed, except that the catalyst consists of 1.148 millimoles of ethyl aluminum dichloride, 0.287 millimoles of $VOCl_3$, and 0.287 millimoles of triethyl phosphate. 3.64 grams of elastomeric product are recovered, containing 43.8% ethylene, and having an RSV of 3.09. In a control run, omitting the triethyl phosphate, 1.81 grams of product having an RSV of 1.49 are recovered.

*Example 18*

The general procedure of Example 11 is followed, except that the catalyst consists of 0.861 millimoles of ethyl aluminum dichloride, 0.287 millimoles of $VOCl_3$, and 0.287 millimoles of tris-dichloropropyl phosphate. 2.64 grams of elastomeric product having an ethylene content of 43.2% and an RSV of 1.74 are recovered.

*Example 19*

Example 18 is repeated, substituting tris-beta-chloroethyl phosphate for the phosphate used in that example. 3.48 grams of elastomeric product having an ethylene content of 48.6% and an RSV of 2.95 are recovered.

*Example 20*

The general procedure of Example 11 is followed, the catalyst being 0.574 millimole of ethyl aluminum dichloride, 0.287 millimole of $VOCl_3$, and 0.04 millimole of triethyl phosphate. 2.03 grams of elastomeric copolymer are recovered, having an ethylene content of 44.9% and an RSV of 3.67.

*Example 21*

Example 20 is repeated, increasing the triethyl phosphate to 0.06 millimole. The yield of elastomeric copolymer is 2.25 grams. It contains 43.1% ethylene and has a reduced specific viscosity of 4.71.

*Example 22*

Example 20 is repeated, increasing the triethyl phosphate to 0.08 millimole. 2.97 grams of elastomeric product are recovered. It contains 47.4% ethylene and has an RSV of 1.57.

*Example 23*

Example 20 is repeated, increasing the triethyl phosphate to 0.146 millimole. 2.90 grams of elastomeric product having an ethylene content of 50.2% and an RSV of 1.98 are recovered.

*Example 24*

The procedure of Example 11 is followed, except that the phosphorus compound is dimethyl methyl phosphonate and the feed mix is 65% ethylene and 35% propylene. The catalyst is 0.861 millimole of ethyl aluminum dichloride, 0.287 millimole of $VOCl_3$, and 0.15 millimole of dimethyl methyl phosphonate. 3.13 grams of elastomeric product having an ethylene content of 55.8% and an RSV of 3.20 are recovered.

*Example 25*

This example shows the use of my novel catalyst system in the production of a sulfur vulcanizable terpolymer of ethylene, propylene, and dicyclopentadiene. This procedure followed is as follows: A polymerization bottle is charged with 100 ml. benzene, 0.861 millimole of ethyl aluminum dichloride, 0.287 millimole of tri-o-cresyl phosphate, and 0.13 ml. of dicyclopentadiene. The bottle is then pressured with a mixture of 30% ethylene and 70% propylene to 45 p.s.i.g. 0.287 millimole of $VOCl_3$ is added, and the bottle is placed in the oil bath at 40° C. After seven minutes and again after 15 minutes an additional 0.13 ml. of dicyclopentadiene is added. After 30 minutes the reaction is stopped, and the reaction product worked up to recover a total of 2.70 grams of terpolymer containing 77.4% ethylene and 1.39 mol percent unsaturation.

*Example 26*

Example 25 is repeated, substituting triphenyl phosphine oxide for the tri-o-cresyl of Example 25. 2.10 grams of terpolymer are recovered, having an ethylene content of 75.8%, and RSV of 3.42, and 1.20 mol percent unsaturation.

*Example 27*

Example 26 is repeated, except that a total of .99 ml. of dicyclopentadiene is added in three equal portions. The recovered terpolymer weighs 1.83 grams, and has 2.40 mol percent unsaturation, and an ethylene content of 85.1%.

*Example 28*

Example 25 is repeated, substituting tri-m-cresyl phosphate for the tri-o-cresyl phosphate of Example 25. 2.65 grams of terpolymer are recovered, having an ethylene content of 73.4%, and an RSV of 4.63, and 1.09 mol percent unsaturation.

*Example 29*

Example 28 is repeated, except that a total of .99 ml. of dicyclopentadiene is added in three equal portions. The recovered terpolymer weighs 2.55 grams, has an ethylene content of 86.6%, and has 2.73 mol percent unsaturation.

*Example 30*

Example 29 is repeated, substituting tri-phenyl phosphate for the tri-o-cresyl phosphate af Example 29. 3.09 grams of polymer containing 76.4% ethylene and having 2.26 mol percent unsaturation are recovered.

The polymers of Examples 25–30 can all be vulcanized by standard butyl rubber recipes to form valuable synthetic rubbers. While the properties will vary to some extent depending on the mol percent unsaturation, a typical rubber formed by compounding 100 parts of the terpolymer with 50 parts of HAF carbon black, 1.5 parts of sulfur, 5 parts of ZnO, 1.5 parts of Thionex, and 0.5 parts of MBT, and cured at 320° F. for 30 minutes will have the following properties:

| | |
|---|---|
| Tensile strength _____ p.s.i__ | 2425 |
| 100% modulus _____ p.s.i__ | 525 |
| 200% modulus _____ p.s.i__ | 1400 |
| 300% modulus _____ p.s.i__ | 2400 |
| Percent elongation _____ | 300 |
| Shore A hardness _____ | 70 |
| Permanent set _____ percent__ | 13 |

The invention claimed is:

1. A process for the copolymerization of olefins which comprises contacting a mixture of ethylene and at least one other hydrocarbon containing olefinic unsaturation selected from the group consisting of lower alpha-olefins and dicyclopentadiene, in an inert solvent, with a catalyst consisting essentially of the product obtained by mixing an aluminum alkyl dihalide, vanadium oxytrichloride, and an organic phosphorous compound selected from the group consisting of phosphates, thiophosphates, phosphonates, phosphines, and phosphine oxides, wherein the mol ratio of the aluminum compound to vanadium oxytrichloride is from 1:1 to 10:1, and the mol ratio of the aluminum compound to the phosphorus compound is from 12:1 to 1:1.

2. The process according to claim 1 in which the phosphorus compound is tritolylthiophosphate.

3. The process according to claim 1 in which the phosphorus compound is triphenyl phosphine.

4. The process according to claim 1 in which the phosphorus compound is tricresyl phosphate.

5. The process according to claim 1 in which the phosphorous compound is trioctylphosphine oxide.

6. The process according to claim 1 in which the phosphorous compound is triphenyl phosphineoxide.

7. A process for the copolymerization of ethylene and propylene which comprises contacting, in an inert solvent, at a temperature of from 0° C. to 150° C., a mixture of ethylene and propylene containing from 20% to 80% ethylene with a catalyst consisting essentially of the product obtained by mixing an aluminum alkyl dihalide, vanadium oxytrichloride, and an organic phosphorus compound selected from the group consisting of phosphates, thiophosphates, phosphonates, phosphines, and phosphine oxides, wherein the mol ratio of the aluminum compound to vanadium oxytrichloride is from 1:1 to 10:1, and the mol ratio of aluminum compound to phosphorus compound is from 12:1 to 1:1, and recovering an essentially amorphous ethylene-propylene copolymer.

8. The process according to claim 7 in which the aluminum alkyl dihalide is an aluminum alkyl dichloride and the phosphorus compound is triethyl phosphate.

9. The process according to claim 7 in which the aluminum alkyl dihalide is an aluminum alkyl dichloride and the phosphorus compound is diethyl ethyl phosphonate.

10. The process according to claim 7 in which the aluminum alkyl dihalide is an aluminum alkyl dichloride and the phosphorus compound is tris-betachloroethyl phosphate.

11. The process according to claim 7 in which the aluminum alkyl dihalide is an aluminum alkyl dichloride and the phosphorus compound is tri-p-toyly thiophosphate.

12. A composition having catalytic activity in the copolymerization of olefins which consists essentially of the product obtained by mixing, in an inert solvent, an aluminum alkyl dihalide, vanadium oxytrichloride, and tri-p-tolyl thiophosphate, wherein the mol ratio of the aluminum alkyl dihalide to vanadium oxytrichloride is from 1:1 to 10:1 and the mol ratio of the aluminum alkyl dihalide to the tri-p-tolyl thiophosphite is from 12:1 to 1:1.

References Cited by the Examiner

UNITED STATES PATENTS

| | | | |
|---|---|---|---|
| 2,969,345 | 1/1961 | Coover et al. | 260—93.7 |
| 3,081,287 | 3/1963 | Coover et al. | 260—93.7 |
| 3,088,942 | 5/1963 | Coover et al. | 260—93.7 |
| 3,116,274 | 12/1963 | Boehm | 260—94.9 |

FOREIGN PATENTS 553,655  6/1961  Belgium.

JOSEPH L. SCHOFER, *Primary Examiner.*

M. B. KURTZMAN, *Assistant Examiner.*